INVENTOR.
JOHN B. ROSSO
ATTORNEY

INVENTOR.
JOHN B. ROSSO

ATTORNEY

United States Patent Office 3,621,716
Patented Nov. 23, 1971

3,621,716
METHOD AND MEANS FOR COMPENSATING A NONLINEAR RESPONSE IN AN ELECTRICAL CIRCUIT
John B. Rosso, Tulsa, Okla., assignor to Combustion Engineering, Inc., New York, N.Y.
Filed Oct. 14, 1969, Ser. No. 866,231
Int. Cl. G01f 1/00
U.S. Cl. 73—194 R                5 Claims

ABSTRACT OF THE DISCLOSURE

A function generator in combination with the Net Oil Computer of U.S. Patent No. 3,385,108. The change in amplitude of the voltage produced from a capacitance device is nonlinear with a change in the ratio of constituents of a fluid mixture. The voltage is amplified by a curve-shaper circuit comprised of a voltage-dividing arrangement of resistors through which the voltage is applied to bias the bases of a plurality of transistors. Slope potentiometers acting through an operational amplifier for increments of the input curve control the ratio between the voltage input due to the capacitance device and the voltage output of the amplifier. A composite voltage output substantially linear with respect to the ratio of constituents of the fluid mixture is produced.

BACKGROUND OF THE INVENTION

(1) Field of the invention

The present invention relates to increasing the accuracy of electronic measurement of a physical property. More particularly, the invention relates to curve-shaping the nonlinear output of an electronic sensing device to produce a substantially linear output from the sensing device.

(2) Description of the prior art

Measurement of physical properties by electronic sensing elements in direct contact with a substance is well known. U.S. Pat. 3,385,108 discloses the use of this technique in a Net Oil Computer. In that device, voltages proportional to the flow rate and dielectric constant of a flowing fluid mixture are produced, respectively, by a flow meter and a capacitance-measuring device. The voltage due to the capacitance device is compared to a fixed-timebase sawtooth voltage. The results of the comparison gate the voltage pulses of the meter to means which manifest certain physical characteristics of the mixture such as the quantity of oil and water therein.

It has long been a problem to obtain an accurate measurement of these characteristics. Specifically, the capacitance of the mixture of fluid dielectrics was known to be correlative to the ratio of the fluid constituents, but the consistency and extent of the correlation were not known. The relationship between capacitance measurements and the ratio of oil and water in a mixture was, for example, not consistent as the percentages varied, or when the ratio of oil to water was increasing as opposed to when it was decreasing, or when different types and grades of oils were present. It is to the solution of this problem that the present invention is directed.

SUMMARY OF THE INVENTION

A principal object of the invention is to combine certain electrical circuits to amplify an output voltage due to an electronic sensing device which measures the dielectric constant of a flowing fluid mixture in such a way that the change in voltage with respect to the change in dielectric constant is linear, whereby the accuracy of measurement of a parameter of the mixture which varies as the dielectric varies is improved.

The invention contemplates circuitry whereby the volumes of certain constituents of a flowing fluid mixture are accurately manifested.

A first primary element is responsive to the flow rate of the fluid mixture, and produces voltage pulses of a frequency proportional thereto. A second primary element is responsive to the dielectric constant of the fluid mixture, and produces a capacitance which is translated into a voltage of an amplitude proportional thereto. This latter voltage is amplified in an amount proportional to its amplitude to linearize the output of the second primary element with respect to the dielectric constant (and therefore the ratio of constituents) of the flowing fluid mixture. The resultant voltage is then compared to a fixed-time-base signal whose amplitude is directly proportional to time. The voltage pulse resulting from this comparison is utilized to gate the voltage pulses generated by the first primary element to one or more outputs for manifestation of the amounts of the flowing mixture's constituents, or of a selected one or a combination of them.

Other objects, advantages and features of this invention will become apparent to one skilled in the art upon consideration of the written specification, appended claims, and attached drawings, wherein:

Figure 2:
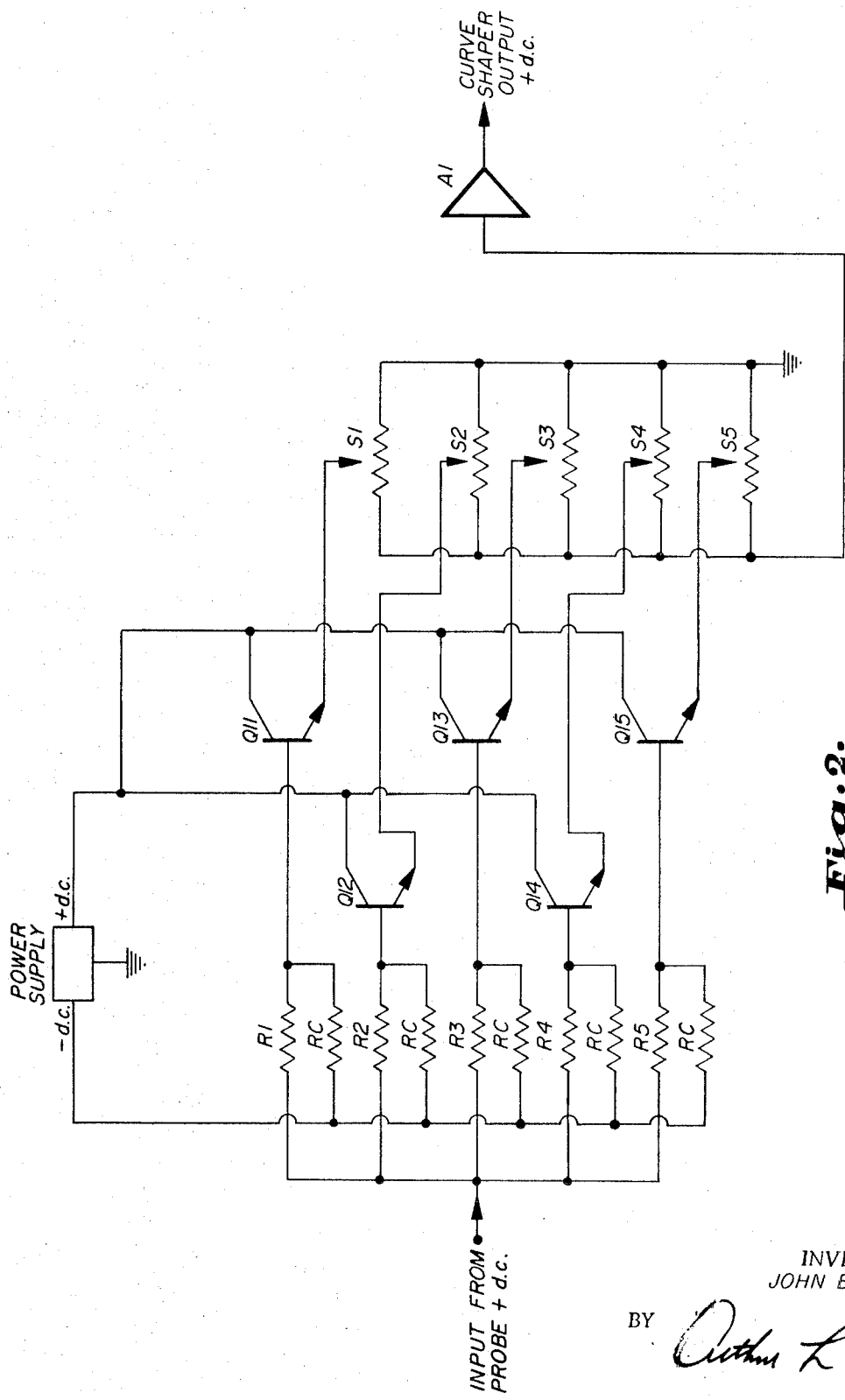
FIG. 2 is a schematic diagram of the curve-shaping circuit of the combination.
Figure 3:
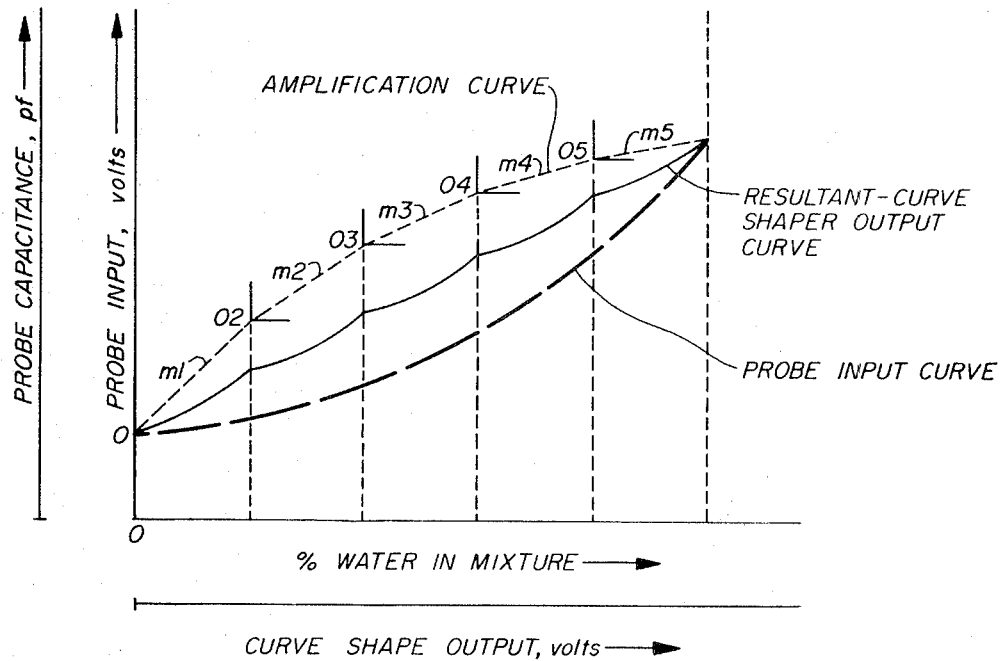
Figure 2A:
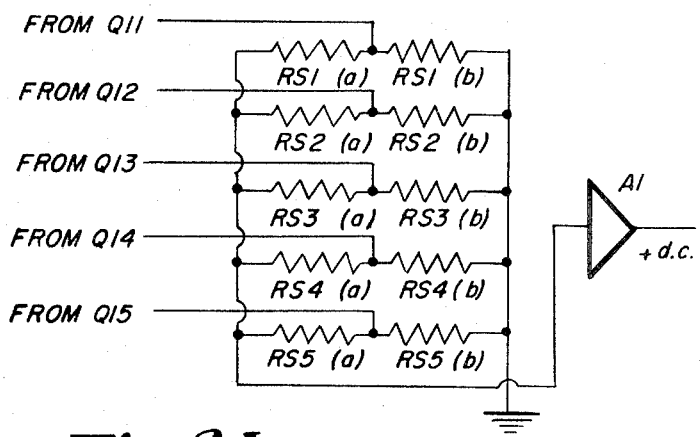

FIG. 2–A is a schematic of a portion of FIG. 2 depicting the use of fixed resistance pairs as an alternative to the use of slope potentiometers; and FIG. 3 is a representation of input amplification and resulant voltage curves as function of the dielectric.

DESCRIPTION OF THE PREFERRED EMBODIMENT

(1) The reference

Figure 1:
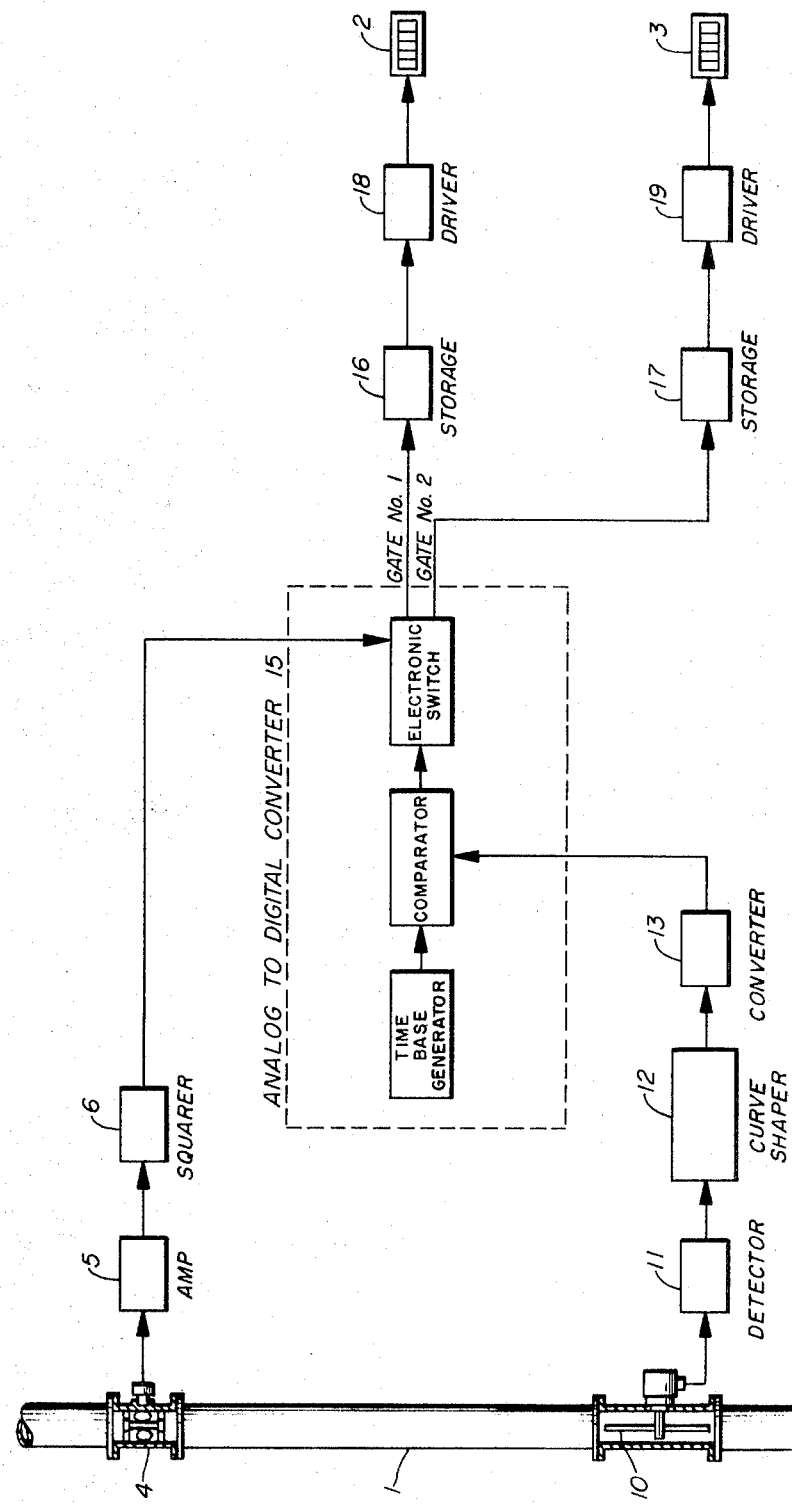
FIG. 1 is a diagrammatic representation of the components of a system in which the present invention is embodied for manifesting the amounts of selected liquids of a mixture.

FIG. 1 discloses the preferred embodiment of the invention in a system for the measurement and manifestation of oil and water volumes present in a flowing mixture thereof. The basic means for carrying out such measurements are disclosed in U.S. Pat. 3,385,108. Material in U.S. 3,385,108 which is essential to the disclosure of the present invention is hereby incorporated by reference.

In FIG. 1, oil well liquids flow through conduit 1. The quantities of oil and water of the liquids are manifested on registers 2, 3. An accurate measurement of these quantities is the end result of the disclosed embodiment of the invention.

It is to be understood that the present invention is not limited to the accurate measurement of oil well production liquids. Any combination of fluids which will properly actuate the primary elements can be measured by the invention. However, the usual mixture of oil well production comprised of oil and water will be referred to in this disclosure for simplicity and consistency.

(2) Detection of flow

Turbine meter 4 is placed in conduit 1 as a primary element responsive to the flow of the mixture of liquids. The magnetic pick-up of the turbine meter generates a pulse form of voltage at a frequency proportional to the flow rate.

Amplifying network 5 is connected to the turbine meter pick-up to amplify the voltage pulse as required by the subsequent circuit elements. The amplified signal is next applied at squarer 6, a circuit which shapes the amplified voltage pulse to a square wave form of constant amplitude. The frequency of this signal remains proportional to flow rate. These pulses, initially generated by the meter 4, are to be diverted to digital counters 2 and 3, as explained below.

(3) Detection of selected fluid

A capacitor 10 is also placed in conduit 1 as a primary element. Capacitor 10 is mounted so the mixture of fluids passes between its plates. Thus, the dielectric constant of the mixture is continuously measured at the same time the flow rate of the mixture is measured by meter 4.

As the water content of the mixture changes, the capacitance of probe 10 changes, increasing as percent water increases. Probe 10 is connected to detector 11 to produce a voltage. The signal is applied at generator 12 and converter 13 to produce a D.C. voltage of an amplitude proportional to the water content of the mixture passing through conduit 1. This D.C. voltage is applied to the diversion of the voltage pulses from squarer 6 to the counters 2 and 3. The probe signal is an analog of the percent of water in the mixture of liquids and, together with the output of squarer 6, is fed to the converter network 15 for the control of the flow pulses.

(4) The problem and its solution in detection of the fluid

Experimentation has revealed that the voltage output due to the capacitance at probe 10 is nonlinear with respect to the percent water in the fluid mixture. In other words, the change in capacitance of the dielectric is not in linear proportion to the change in the percent water of the mixture.

This relationship between capacitance and the water/oil ratio of the mixture was not always understood. It was first believed that a simple linear relation existed between capacitance of a mixture of oil and water (even though fluids of highly different dielectric constants) and the ratio of the oil and water present in the mixture.

It was further believed that the differences in the relative conductivity between the dielectrics would not alter the supposed linear relationship. It was known that the slope of the capacitance to dielectric curve would change when relative conductivity changed, but not that the linearity of the curve would also change.

Field applications of the Net Oil Computer of U.S. 3,385,108 revealed that errors were present in the measurement of oil and water quantities in well streams that were not inherent in the method of the computer, in calibration techniques, and so forth. At the same time, laboratory testing of that and similar devices for measurement of oil and water volumes in a mixture revealed similar errors.

Continued empirical work and increased understanding of the physical aspects of liquid mixtures led to the hypothesis, later verified and proved, that *any* change in the ratio of volumes in a mixture of highly dissimilar liquid dielectrics, such as oil and water, resulted in a change in the electrical conductivity, i.e., in the dielectric constant, of the mixture in *nonlinear* proportion to the change in ratio.

(5) Correction of the probe output voltage

Correction of the error introduced by the nonlinearity discussed above requires correction of the voltage signal due to the probe 10, specifically to the amplitude of the signal at detector 11. A curve shaper circuit 12 is disclosed for correctional amplification of signals produced at 11.

(6) The corrective function

By referring to FIGS. 2 and 3, the operation of the curve-shaping circuit may be understood.

The input to curve shaper 12 from detector 1 is an analog D.C. voltage proportional to the percent water in the flowing fluid. This signal may be conditioned for application at 12 in various well known ways; for example, input impedance may be controlled by use of an operational amplifier.

The positive D.C. input voltage is divided across the several voltage-dividing resistor pairs at $R_c$ and $R_{1-5}$. $R_c$ is a constant value resistor; $R_1$ through $R_5$ are of increasingly larger resistances. Thus, a proportionally lesser voltage is developed across $R_1$ than $R_2$, $R_3$, $R_4$, or $R_5$, and across $R_2$ than $R_3$, $R_4$, or $R_5$, and so on. The potential at the junction of any two of the pairs is accordingly varied.

When the potential at the junction of any pair of resistors is slightly higher than zero, it is seen that the base of the transistor to which the resistor pair is connected is biased and its transistor conducts. Each transistor will become conductive at a definite predetermined point along the probe input curve, according to the sizing of $R_{1-5}$. Conversely, not all transistors will necessarily be simultaneously conductive. For example, since $R_5$ is larger than $R_1$, a given input from detector 11 may be insufficient to overcome the negative bias of the power supply and raise the voltage on the base of $Q_{15}$ to positive. The threshold of conductivity of each of the transistors is thereby fixed as a function of the input voltage. Each transistr will become conductive at a definite point on the input curve, as shown in FIG. 3. These points occur at the voltage levels of the intersection of the input curve and the vertical dotted lines.

Note from FIG. 2 that transistors $Q_{11-15}$ are arranged in an emiter-follower configuration by connection of their collector legs to the positive side of the power supply. A higher voltage (above the "turn-on" point) at the base of any transistor in response to an increase in input voltage will thus cause the transistor to become more conductive. The increase in conductivity will be in linear relation to the increase in input from detector 11.

It remains to accommodate the rate of change, or slope, of shaper 12 output to its input from detector 11. This function is accomplished by slope potentiometers $S_1$ through $S_5$ and operational amplifier $A_1$. The resistance of the potentiometers will be varied individually according to the deviations from linear of probe 10 output across the several increments into which its range of response is divided. Since five transistors are employed in the embodiment, successive one-fifth increments of the probe 10 output may be compensated. Fewer or more than five increments of the probe output curve may be adjusted by using fewer or more than five transistors, with appropriate dividers and slope pots, of course. The use of a greater or lesser number of transistors allows more or less increments of the input to be adjusted in slope, and renders the output more or less linear; thus the use of the phrase "substantially linear." Note the resultant of FIG. 3.

The use of potentiometers $S_{1-5}$ determines the slope of the amplifier $A_1$ output with respect to the emitter voltage. When a low resistance to the emitter is set into a potentiometer by moving the contact point to the right in FIG. 2, the conductivity of the transistor is high; in like manner, the resistance to the amplifier is then high and current to its summing point is low. The reverse obtains when the contact is set to the left.

The current at $A_1$ determines the voltage amplification of shaper 12. When the current is low at $A_1$, its output is low for a given input from probe 10, and the slope of the output vs. input curve is small. Conversely, when $S_1$ resistance, for example, is high to the emitter of $Q_{11}$, current is low to the emitter and high to the amplifier and the slop $m_1$ of the output/input ratio is great.

FIG. 3 is a concise graphical satement of the operation of curve-shaper 12. It is understood that error in the comparison by the comparator of converter 15 wowuld be introduced by the nonlinearity of the probe output curve. When the probe output voltage is low and only $Q_{11}$ is "on" shaper 12 output is relatively low, but the slope of gain curve $O_1$-$O_2$ is high by setting a relatively low resistance to the amplifier $A_1$ in $S_1$. As probe input increases, the bias on $Q_{12}$ is finally raised to slightly positive and it conducts at a certain rate according to the division of resistance set at $S_2$. The voltage output of curve-shaper 12 is now a composite of the conductivity of $Q_{11}$, $Q_{12}$. In this embodiment, due to the characteristics of the probe input curve, $S_2$ must be set more resistive to $A_1$ than $S_1$, and the slope $m_2$ of the $O_2$-$O_3$ amplification curve is less than $m_1$. The system responds thus for any particular input, until all transistors are conductive and slope is minimum.

When it is recalled that the probe 10 output is nonlinear with respect to the change in dielectric of the liquid mixture, it is understood that the linear amplification of predetermined slopes may be imposed over the several segments of the probe input curve to shaper 12 to result in a substantial linearity between a change in composition of the dielectric and probe output. This technique, then, of amplification of segments of the nonlinear output of the sensing element is accomplished by the curve-shaper component 12. In combination with the Net Oil Computer circuits, a solution to the problem of error in the measurement of oil and water in the flowing fluid mixture results and the accuracy of the measurement is greatly enhanced.

(7) Application of the curve-shaper voltage

The output voltage of generator 12 is now applied at converter 13 for amplication to a level acceptable at analog-to-digital converter 15, as shown in FIG. 1. It has been described how the circuit 15 receives two inputs. The first input is the square wave voltage pulses from the turbine meter. The second input is the D.C. voltage generated by probe 10.

Within converter 15, a circuit is arranged to generate a fixed-time-base voltage whose amplitude is directly proportional to time. This form of voltage variation is commonly referred to as a linear sawtooth. The D.C. voltage from converter 13 is compared to the time-base voltage. When the two voltages are equal, a gating circuit is operated to divert the voltage pulses from the turbine to one of two outputs.

The comparison function and gating function are carried out with solid state electronic components. The outputs from the gating circuits are disclosed here as connected to storage circuits 16 and 17; the storage circuits are connected to driver circuits 18 and 19; and the driver circuits are shown as controlling the registers 2 and 3. However, it is again emphasized that the outputs from analog-to-digital converter 15 could feed any number of complex computer circuits designed to receive and utilize this form of the information concerning the composition of the mixture flowing in conduit 1. Registers 2 and 3 are only examples of a simple form of structure with which to manifest the measurement.

Further and more detailed disclosure of the operation and circuitry of converter 15 may be had by reference to U.S. 3,385,108 which is incorporated as to material essential to the present disclosure. For ease of use of the reference patent, numbering of the figures of the subject application is consistent therewith. Reference is also directed to 3,385,108 for further elaboration of the disclosure pertaining to FIG. 1, or as otherwise required for understanding of the specification.

(8) Summary

The concept of the invention is seen in the preferred embodiment to provide a solution to the problem of the large error introduced by the nonlinearity of the voltage signal from the sensing element, probe 10. The accuracy of the gating and registration is thus much improved, since a substantially linear input is now furnished for comparison to the linear sawtooth.

It is noted that by addition to the circuit of FIG. 2 of other transistor networks to divide the input curve into smaller increments in the manner described above, the output signal may be rendered more and more substantially linear. The number of separate amplification stages, however, is not material to the basis of the concept.

If the output function of the sensing element should be such that the sense of the slope was required to be negative, it is obvious merely to employ an inverting amplifier at $A_1$ to yield a negative slope to the output voltage. Furthermore, if slope between increments of the amplification curve was required to change between positive and negative, it will be obvious that inverting and non-inverting operational amplifiers could be coupled to produce a slope of the required sense. Correction of a complex signal is within the scope of the invention; it is only required that the shape of the input signal be predictable.

It is stressed that other circuit components could be employed in the curve-shaping circuit within the scope of the invention. For example, transistors $Q_{11-15}$ and the D.C. power supply could be replaced by diodes and a power amplifier to develop the necessary current at the summing point of $A_1$.

Similarly, it is apparent to the skilled practitioner that, under certain circumstances, the slope potentiometers could be replaced by fixed resistor pairs. The function of the resistances at $S_{1-5}$, whether fixed or variable, is to divide the current between the transistors and the amplifier $A_1$ to control the amplification of $A_1$. If the dielectric constants of the constituents of the mixture are expected to change, then the input curve will change and the slope pots can be adjusted to maintain the linear resultant. However, if the dielectric constant of the constituents are not expected to change, then no adjustments in the resistance divisions at $S_{1-5}$ will be required, and fixed resistors can replace the more expensive potentiometers. This configuration is shown in FIG. 2–A, where the five resistance pairs $R_{s1(a)}$–$R_{s5(b)}$, all appropriately sized to accommodate the conductive characteristics of the particular dielectric, have replaced the slope pots $S_{1-5}$ of FIG. 2.

From the foregoing it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system which generates an analog D.C. voltage proportional to the ratio of constituents of a flowing fluid mixture, including, a first primary element placed in contact with the flowing fluid mixture so as to respond to the flow by generating a large number of voltage pulses per volume unit of mixture flowing past the first primary element at a frequency proportional to the rate of flow, a second primary element in contact with the flowing fluid mixture to measure the capacitance thereof and generating an analog D.C. voltage in nonlinear proportion to the volume of a selected one of the fluids in a volume unit of the mixture, a plurality of transistors connected by their bases to the second primary element through a voltage-dividing arrangement of resistors to produce a predetermined bias on the base of each transistor and control the threshold of conductivity thereof, each transistor being in an emitter-follower configuration and therefore having a voltage at its emitter in proportion to the voltage generated by the second primary element, and a slope potentiometer connected to the emitter of each transistor to control the conductivity of its transistor and connected to an operational amplifier to control the current at its summing point, the plurality of potentiometers being connected to each other so that a composite analog D.C. voltage is produced that is substantially linear in proportion to the volume of the selected one of the fluids in the volume unit of the mixture, a generator producing a voltage which periodically varies between a selected minimum value and a selected maximum value in a linear function within a selected time period, a comparative circuit connected between the transistors and generator and producing separate outputs of different voltage levels over the two separate portions of the selected time period during which the primary element and generator voltages being compared are unequal, and a switching and manifesting means connected to the first primary element and the output of the comparative circuit to apply the output voltage to connect the first primary element to the manifesting means during one of the portions of the selected time period to cause manifestion of the quantity of one fluid of the flowing mixture.

2. The circuit of claim 1 in which the first primary element includes:

a turbine meter through which the fluid mixture flows to generate a voltage of sinusoidal form, and an amplifying and modifying circuit which converts the sinusoidal form of voltage to a square wave form which is constant in amplitude and varies in frequency proportional to the rate of flow of the fluid mixture through the meter.

3. A system which generates an analog D.C. voltage proportional to the ratio of constituents of a flowing fluid mixture, including, a first primary element placed in contact with the flowing fluid mixture so as to respond to the flow by generating a large number of voltage pulses per volume unit of mixture flowing past the first primary element at a frequency proportional to the rate of flow, a second primary element in contact with the flowing fluid mixture to measure the capacitance thereof and generating an analog D.C. voltage in nonlinear proportion to the volume of a selected one of the fluids in a volume unit of the mixture, a plurality of transistors connected by their bases to the second primary element through a voltage-dividing arrangement of resistors to produce a predetermined bias on the base of each transistor and control the threshold of conductivity thereof, each transistor being in an emitter-follower configuration and therefore having a voltage at its emitter in proportion to the voltage generated by the second primary element, a plurality of fixed resistor pairs, one of the two resistors of each pair being connected to the emitter of a transistor to control its conductivity and the other resistor of the pair being connected to an operational amplifier to control the current at its summing point, the plurality of resistor pairs also being connected to each other so that a composite D.C. voltage is produced that is substantially linear in proportion to the volume of the selected one of the fluids in the volume unit of the mixture, and so that the slopes of the amplification curve's several segments are fixed by the sizing of the resistors of the several resistor pairs, a generator producing a voltage which periodically varies between a selected minimum valve and a selected maximum value in a linear function within a selected time period, a comparative circuit connected between the transistors and generator and producing separate outputs of different voltage levels over the two separate portions of the selected time period during which the primary element and generator voltages being compared are unequal, and a switching and manifesting means connected to the first primary element and the output of the comparative circuit to apply the output voltage to connect the first primary element to the manifesting means during one of the portions of the selected time period to cause manifestation of the quantity of one fluid of the flowing mixture.

4. The method of generating an analog D.C. voltage proportional to the ratio of constituents of a flowing fluid mixture, including, generation of a large number of voltage pulses proportional to flow rate of the mixture, measurement of the capacitance of the mixture and generation of an analog D.C. voltage signal proportional in nonlinear relation to the dielectric constant of the mixture, amplification of the voltage signal through a resistance-dividing network connected to a switching network, the switching network being connected to a series of slope-adjusting potentiometers to produce a predetermined current to an operational amplifier over the several increments of the input curve, whereby an amplification is produced to correct the nonlinearity of the input voltage, generation of a fixed-time-base voltage varying periodically in a linear function between selected minimum and maximum values, electronically comparing the fixed-time-base voltage and the voltage due to the capacitance measurement, and thereby producing separate outputs of different voltage levels over the two separate portions of the fixed-time base during which the voltage due to flow rate and the voltage due to capacitance are unequal, and switching and manifesting the voltage pulses proportional to flow rate during one of the portions of the selected time period by applying the output voltage to connect the pulse generator to the manifesting means during one of the two separate portions of the fixed-time base, thus manifesting the quantity of one fluid of the flowing mixture.

5. The method of generating an analog D.C. voltage proportional to the ratio of constituents of a flowing fluid mixture, including, generation of a large number of voltage pulses proportional to flow rate of the mixture, measurement of the capacitance of the mixture and generation of an analog D.C. voltage signal proportional in nonlinear relation to the dielectric constant of the mixture, amplification of the voltage signal through a first resistance-dividing network connected to a switching network, the switching network being connected to a series of fixed resistance pairs of resistors which comprise a second resistance-dividing network to produce a predetermined current to an operational amplifier over the several increments of the input curve, whereby an amplification is produced to correct the non-linearity of the input voltage, generation of a fixed-time-base voltage varying periodically in a linear function between selected minimum and maximum values, electronically comparing the fixed-time-base voltage and the voltage due to the capacitance measurement, and thereby producing separate outputs of different voltage levels over the two separate portions of the fixed-time base during which the voltage due to flow rate and the voltage due to capacitance are unequal, and switching and manifesting the voltage pulses proportional to flow rate during one of the portions of the selected time period by applying the output voltage to connect the pulse generator to the manifesting means during one of the two separate portions of the fixed-time base, thus manifesting the quantity of one fluid of the flowing mixture.

References Cited

UNITED STATES PATENTS

| | | | |
|---|---|---|---|
| 2,720,624 | 10/1955 | Gunst et al. | 324—61 |
| 3,385,108 | 5/1968 | Rosso | 73—231 MX |
| 3,419,801 | 12/1968 | Cohn | 324—61 |

FOREIGN PATENTS

| | | | |
|---|---|---|---|
| 828,730 | 2/1960 | Great Britain | 73—194 M |

CHARLES A. RUEHL, Primary Examiner

U.S. Cl. X.R.

73—61.1 R, 231 M